US006856869B2

(12) United States Patent
Takahashi (10) Patent No.: US 6,856,869 B2
(45) Date of Patent: Feb. 15, 2005

(54) ELECTRIC POWER STEERING DEVICE (75) Inventor: Toshihiro Takahashi, Nishio (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/350,071

(22) Filed: Jan. 24, 2003

(65) Prior Publication Data
US 2003/0164261 A1 Sep. 4, 2003

(30) Foreign Application Priority Data

Jan. 25, 2002 (JP) ........................................ 2002-017469

(51) Int. Cl.⁷ .............................................. B62D 6/00
(52) U.S. Cl. ......................... 701/41; 180/446; 318/434; 280/735
(58) Field of Search .............................. 701/41, 42, 43; 180/443, 446, 400, 447, 412, 6.2, 6.28, 142, 140; 318/432, 434, 433, 599, 437, 422, 489, 430, 67; 280/735, 91

(56) References Cited

U.S. PATENT DOCUMENTS

| 4,971,173 | A | * | 11/1990 | Takahashi .................... 180/140 |
| 5,032,996 | A | * | 7/1991 | Shiraishi ..................... 180/79.1 |
| 5,065,325 | A | * | 11/1991 | Takahashi .................... 701/43 |
| 5,311,432 | A | * | 5/1994 | Momose ....................... 701/41 |
| 6,129,172 | A | * | 10/2000 | Yoshida et al. .............. 180/446 |
| 6,570,352 | B2 | * | 5/2003 | Hara et al. .................. 318/432 |
| 6,644,433 | B2 | * | 11/2003 | Sato ............................ 180/446 |
| 6,681,165 | B2 | * | 1/2004 | Shibasaki et al. ............ 701/41 |
| 2001/0027364 | A1 | * | 10/2001 | Matsuoka ..................... 701/41 |
| 2002/0033300 | A1 | * | 3/2002 | Takeuchi et al. ............ 180/446 |
| 2002/0056587 | A1 | * | 5/2002 | Shibasaki et al. ........... 180/443 |
| 2002/0060538 | A1 | * | 5/2002 | Hara et al. .................. 318/432 |
| 2002/0063543 | A1 | * | 5/2002 | Kanda ......................... 318/433 |
| 2002/0065593 | A1 | * | 5/2002 | Ozaki .......................... 701/41 |
| 2003/0079933 | A1 | * | 5/2003 | Chabaan ...................... 180/446 |
| 2003/0120404 | A1 | * | 6/2003 | Endo ............................ 701/41 |

FOREIGN PATENT DOCUMENTS

| EP | 0 556 870 | 8/1993 |
| EP | 0 967 135 | 12/1999 |
| JP | 2-290782 | 11/1990 |
| JP | 2001-278084 | 10/2001 |

* cited by examiner

Primary Examiner—Thomas G. Black
Assistant Examiner—Tuan C To
(74) Attorney, Agent, or Firm—Oblon, Spivak, McClelland, Maier & Neustadt, P.C.

(57) ABSTRACT

An electric power steering device which includes a sample reliability level calculation device for calculating a reliability y of a sampling value $\theta_a$ as a neutral angle $\theta_c$ based on a vehicle speed V, a angular velocity ω, a steering torque T, and relating values of the vehicle speed V, the angular velocity ω of the steering angle, and the steering torque T when a sampling condition is established. The neutral angle estimation means temporarily determines, confirms, or renews the value of the neutral angle $\theta_c$ based on the sampling value $\theta_a$ and the reliability level y.

16 Claims, 9 Drawing Sheets

α : UPPER THRESHOLD VALUE OF $T_{r1}$

β : UPPER THRESHOLD VALUE OF $T_{r2}$

FIG. 9

ELECTRIC POWER STEERING DEVICE

This application is based on and claims priority under 35 U.S.C. §119 with respect to Japanese Patent Application No. 2002-017469 filed on Jan. 25, 2002, the entire content of which is incorporated herein by reference.

FIELD OF THE INVENTION

The present invention relates to an electric power steering device for a vehicle. More particularly, the present invention pertains to an electric power steering device having a neutral angle estimation means for estimating a neutral angle $\theta_c$ of a steering angle based on a sampling value $\theta_a$ of the steering angle when a predetermined sampling condition is established being defined by a vehicle speed V, an angular velocity ω of the steering angle, and a steering torque T, or relating values of the vehicle speed V, the angular velocity ω of the steering angle, and the steering torque T.

BACKGROUND OF THE INVENTION

Known electric power steering devices are disclosed in Japanese Patent Laid-Open Publication No. 2001-278084 and Japanese Patent Laid-Open Publication No. H02-290782. The known electric power steering devices include a neutral angle estimation means for estimating a neutral angle $\theta_c$ of a steering angle based on a sampling value $\theta_a$ of the steering angle when a predetermined sampling condition is established. The predetermined sampling condition is defined by a vehicle speed V, an angular velocity ω of the steering angle, a steering torque T, or relating values of the vehicle speed V, the angular velocity ω of the steering angle, and the steering torque T.

Figure 9:
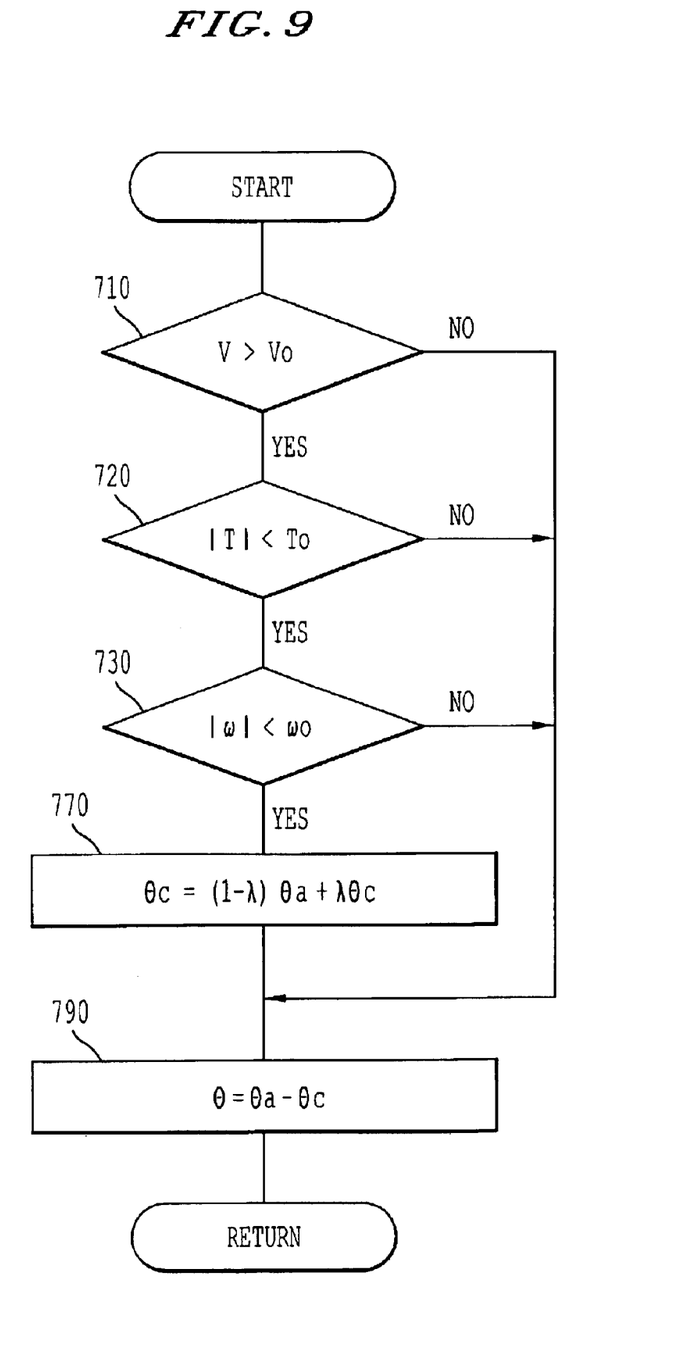
FIG. 9 is a flowchart showing the transaction of a neutral estimation calculation portion (i.e., neutral angle estimation means) of an electric power steering device according to a known device.

FIG. 9 shows transaction of a neutral estimation calculation portion (i.e., the neutral angle estimation means) of the known electric power steering device. With Steps 710–730, whether the predetermined sampling condition defined by the vehicle speed V, the angular velocity to of the steering angle, and the steering torque T is established is examined. $V_0$, $T_0$, and $ω_0$ show predetermined boundary values for defining each boundary condition. When all boundary conditions are satisfied, it is estimated that the steering wheel is positioned approximate to the neutral point. In this case, in Step 770, the value of the neutral angle $\theta_c$ of the steering angle is renewed based on the sampling value $\theta_a$ of the steering angle when the sampling conditions are established. The neutral angle $\theta_c$ on the left side of the equation in Step 770 shows the value which is to be presently obtained and is calculated and renewed every cycle based on last obtained value (i.e., the value of neutral angle $\theta_c$ on the right side of the equation of Step 770).

In this case, a parameter λ includes a predetermined forget factor or a weighting factor depending on the number n of all samples (e.g., (n–1)/n). With the known electric power steering devices, the absolute angle θ (=$\theta_a$–$\theta_c$) referring to the neutral point (i.e., the neutral angle $\theta_c$) is calculated following the foregoing transaction.

For example, with the known devices, the optimization of the parameter λ (i.e., tuning) is not easy and the known devices have following drawbacks.

(1) Problem of Convergence

In order to obtain the neutral angle $\theta_c$ with high precision, it is required to collect large number of samples (i.e., sampling value $\theta_a$). Thus, the estimated value of the neutral angle $\theta_c$ is unlikely converged to a predetermined value in a short period.

Normally, the value of the neutral angle $\theta_c$ memorized during last engine stop is applied as an initial value (i.e., a temporary value) for a present operation. When an error of the initial value is increased due to the steering wheel operation under a state that the engine is stopped, relatively long time is required to converge the estimated value of the neutral angle $\theta_c$ to the predetermined value unless the forget factor (λ) is relatively small. However, when the forget factor (λ) is determined to be an unnecessarily small value, the estimated value is unnecessarily influenced by the most updated sampling value $\theta_a$ to deteriorate the stability of the estimated value.

(2) Problem of the Reliability

On the other hand, even when the estimated value of the neutral angle $\theta_c$ is converged to be a correct value, the position of the correct neutral point (i.e., correct value of the neutral angle $\theta_c$) may be varied due to the disturbance generated relative to the steering system thereafter. In other words, there is no guarantee that the estimated value of the neutral angle $\theta_c$ is always correct not only at the engine start but also during the normal vehicle driving. Thus, with the known electric power steering devices, it is unlikely to achieve the optimum steering wheel returning control always following the reliability of the estimated value.

A need thus exists for an electric power steering wheel device which includes a means for converging an estimated value of a neutral angle $\theta_c$ in a short period with high precision and a means for quantitatively evaluating an accuracy (i.e., reliability) of the estimated value of the neutral angle $\theta_c$ with high precision.

SUMMARY OF THE INVENTION

In light of the foregoing, the present invention provides an electric power steering device which includes a neutral angle estimation means for estimating a neutral angle $\theta_c$ of a steering angle based on a sampling value $\theta_a$ of the steering angle when a predetermined sampling condition is established, the sampling condition being defined by a vehicle speed V, an angular velocity ω of the steering angle, a steering torque T, or relating values of the vehicle speed V, the angular velocity ω of the steering angle, and the steering torque T. The electric power steering device according to the present invention further includes a sample reliability level calculation means for calculating a reliability y of the sampling value $\theta_a$ as the neutral angle $\theta_c$ based on the vehicle speed V, the angular velocity ω, the steering torque T, or the relating values of the vehicle speed V, the angular velocity ω of the steering angle, and the steering torque T when the sampling condition is established. The neutral angle estimation means temporarily determines, confirms, or renews the value of the neutral angle $\theta_c$ based on the sampling value $\theta_a$ and the reliability level y.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Embodiments of an electric power steering device according to the present invention will be explained with reference to the illustrations in the drawing figures.

Figure 3:
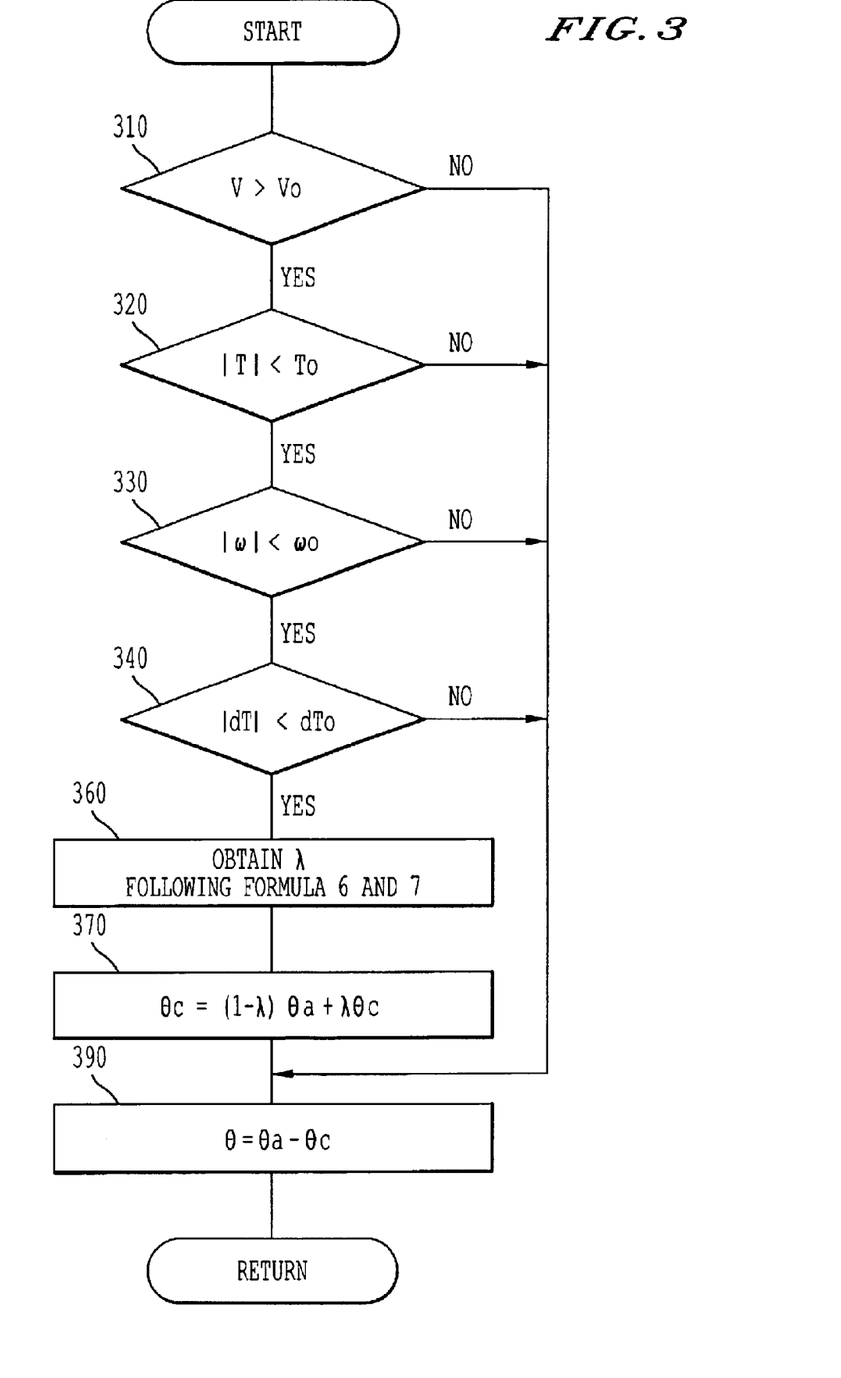
FIG. 3 is a flowchart showing transaction of a neutral estimation calculation portion of the electric power steering device.

A reliability level y of a sampling value $θ_a$ of a steering angle for satisfying the condition of Steps 310–330 (i.e., a predetermined sampling condition) of FIG. 3 is optimized under the conditions shown with formulae 1–3. In this case, a constant $V_{max}$ of formula 1 corresponds to a value of around 80 km/h.

$$V \geq V_{max}[km/h] \quad \text{[Formula 1]}$$

$$T = 0[Nm] \quad \text{[Formula 2]}$$

$$ω = 0[rad/s] \quad \text{[Formula 3]}$$

For example, when the foregoing conditions shown as formulae 1–3 are satisfied, or when the conditions approximate to the foregoing conditions shown as formulae 1–3 are satisfied, the reliability level y as the neutral angle $θ_c$ of the sampling value $θ_a$ is highly increased. In this case, optimizing transaction such as for determining the value of the forget factor λ in Step 770 of FIG. 9 to be a relatively small value can be achieved. Thus, when the reliability level y of the sampling value $θ_a$ as the neutral angle $θ_c$ is high, the estimated value of the neutral angle $θ_c$ is likely to be converged to the sampling value $θ_a$. On the other hand, when the reliability level y of the sampling value $θ_a$ as the neutral angle $θ_c$ is low, the estimated value of the neutral angle $θ_c$ is unlikely influenced by the sampling value $θ_a$.

Figure 1:
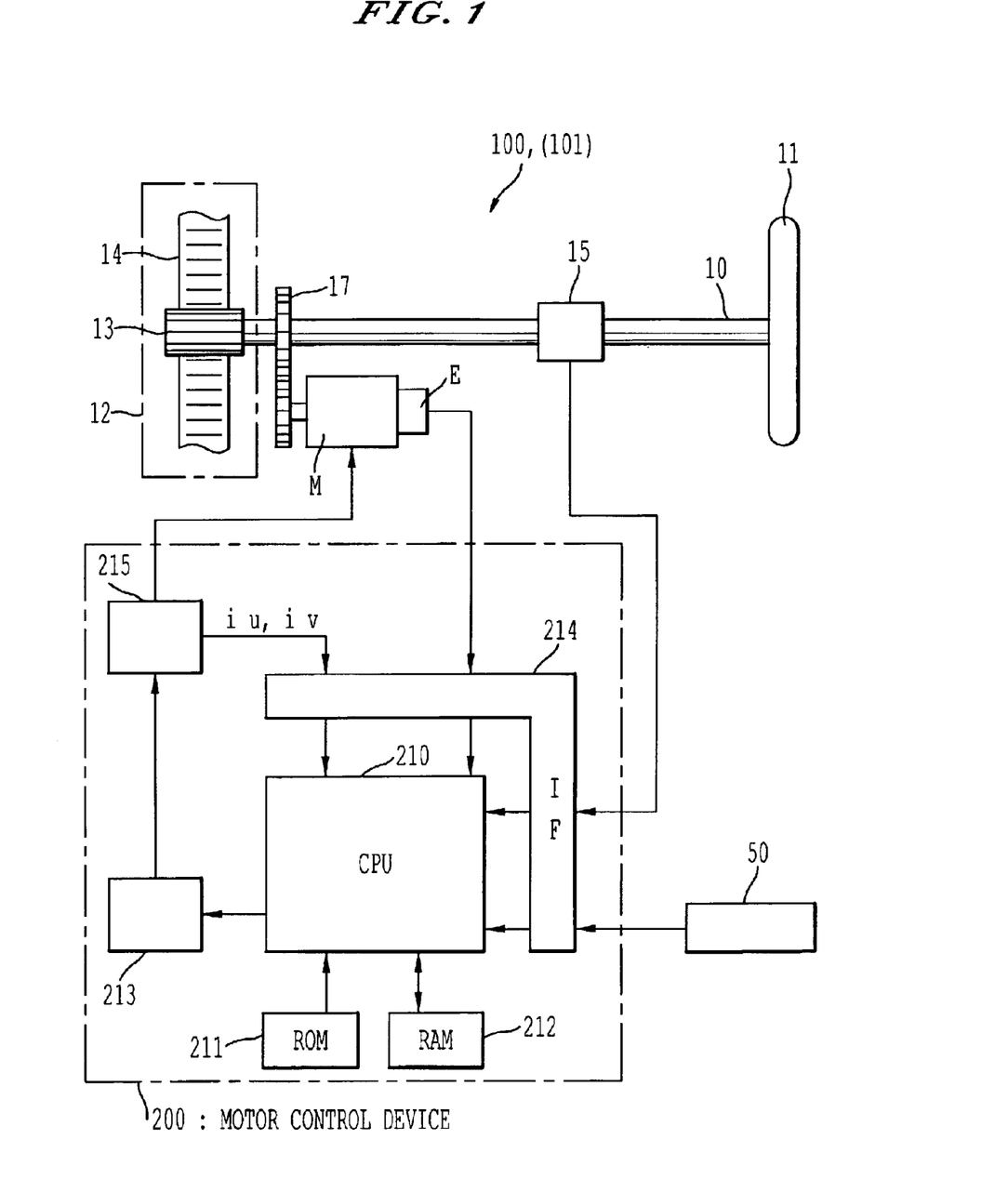
FIG. 1 is a hardware construction view of an electric power steering device according to embodiments of the present invention.

An electric power steering device 100 of a first embodiment will be explained with reference to FIG. 1. A steering wheel 11 is provided on one end of a steering shaft 10. A pinion shaft 13 axially connected to a gear box 12 is provided on the other end of the steering shaft 10. The pinion shaft 13 is geared with a rack shaft 14 fitted in the gear box 12. Both ends of the rack shaft 14 are connected to driving wheels (not shown) via respective ball joints (not shown). The steering shaft 10 is connected to a brush less direct current motor M (i.e. hereinafter referred as a motor M) for providing an assist torque via two gears 17.

Each motor drive electric current iu, iv, iw corresponding to three phases of U, V, W is supplied to the motor M from a drive circuit 213 of a motor control device 200 via an electric current detector 215. Further, the steering shaft 10 is provided with a torque detector (i.e., a torque sensor) 15 for detecting a degree and a direction of a manual steering force (i.e., steering torque T) applied to the steering wheel 11 by an operator.

The motor M is provided with a rotation angle sensor E (i.e., encoder) for synchronization for detecting a rotation angle. A steering angle $θ_a$ of the steering wheel is obtained based on the rotation angle $θ_m$ of the motor M output from the rotation angle sensor E.

The motor control device 200 includes a CPU 210, ROM 211, a RAM 212, the drive circuit 213, an input interface (IF) 214, and the electric current detector 215. The drive circuit 213 includes a battery (not shown), a PWM transformer, and a PMOS drive circuit for supplying the electric power to the motor M by converting the drive current to be a sine wave by the chopper control.

The rotation angle $θ_m$ from the motor M, an output signal (i.e., detected value) from the torque sensor 15 for detecting the steering torque T, and an output signal from a vehicle speed meter 50 for obtaining the vehicle speed V are input to the CPU 210 of the motor control device 200 via the input interface (IF) 214. The CPU 210 determines a torque value (i.e., command torque $T_m$) to be output from the motor M based on a predetermined torque calculation deriving from the input value. Further, each electric current command value (Id*, Iq*) is determined based on the command torque $T_m$. With the first embodiment of the present invention, Id* is determined to be zero (i.e., Id*=0).

Figure 2:
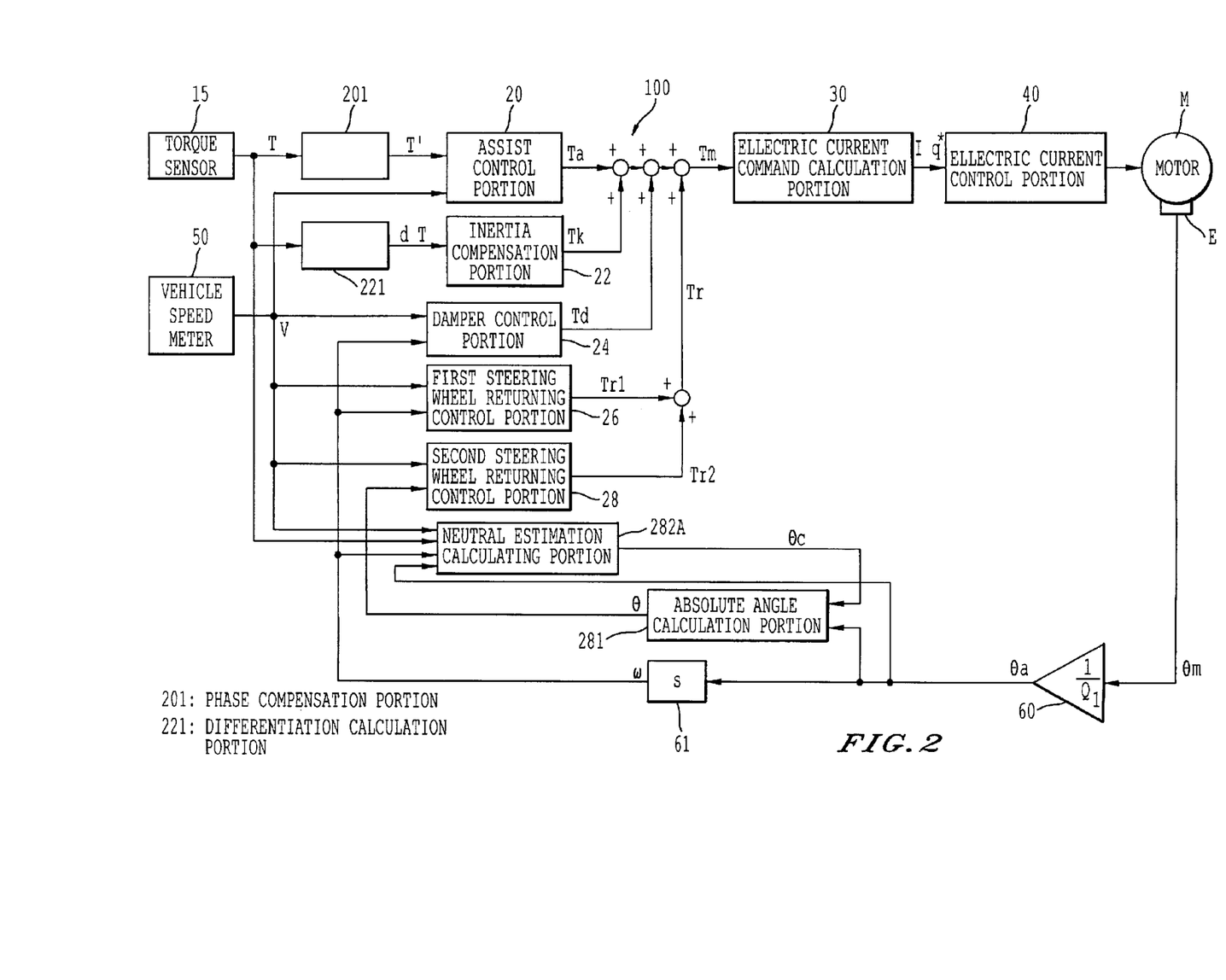
FIG. 2 is a control block diagram of the electric power steering device according to a first embodiment of the present invention.

FIG. 2 shows a control block diagram of the electric power steering device 100 according to the first embodiment. Outputs of each control block are indicated as follows.

The torque sensor 15 outputs the steering torque T.

An assist control portion 20 outputs an assist torque $T_a$.

A phase compensation portion 201 outputs a steering torque T' (i.e., phase compensation value)

An inertia compensation portion 22 outputs an inertia torque $T_k$.

A differentiation calculation portion 221 outputs dT (i.e., a differentiation of the steering torque).

A damper control portion 24 outputs a damper torque $T_d$.

A first steering wheel returning control portion 26 outputs a torque $T_{r1}$ for returning the steering wheel (i.e., portion depending on ω)

A second steering wheel returning control portion 28 outputs a torque $T_{r2}$ for returning the steering wheel (i.e., portion depending on θ)

An absolute angle calculation portion 281 outputs an absolute angle θ of the steering angle.

A neutral estimation calculation portion 282A outputs a neutral angle $θ_c$ of the steering angle.

An electric current command calculation portion 30 outputs a directional electric current Iq*.

The vehicle speed meter 50 outputs the vehicle speed V.

A relative angle calculation portion 60 outputs a relative angle $θ_a$ of the steering angle.

A differentiation calculation portion 61 outputs an angular velocity ω of the steering wheel.

The command torque $T_m$ input into the electric current command calculation portion 30 is calculated following formulae 4 and 5.

$$T_m = T_a + T_k + T_d + T_r \quad \text{[Formula 4]}$$

$$T_r = T_{r1} + T_{r2} \quad \text{[Formula 5]}$$

The electric current control 40 of FIG. 2 carries out the PI control of the motor drive electric current using an electric current loop configured through the electric current detector 215 and the drive circuit 213.

The electric power steering device 100 according to the first embodiment of the present invention is characterized in a calculation method in the neutral estimation calculation portion 282A. FIG. 3 shows a flowchart showing the transaction of the neutral estimation calculation portion 282A (i.e., neutral angle estimation means) of the electric power steering device 100. The transaction identical to Steps 710–730 of FIG. 9 is carried out in Steps 310–330.

In Step 340, a differential dT between the value of the steering torque T input from the torque sensor 15 in the present control cycle and the steering torque of last control cycle. Thereafter the absolute value |dT| of the differential dT is compared to a predetermined threshold value $dT_0$. When the absolute value |dT| of the differential dT is smaller than the predetermined threshold value $dT_0$, the relative angle $\theta_a$ of the steering angle input this time (i.e., present input) is adopted as the sampling value in order to obtain the neutral angle $\theta_c$. The effects and the operation of Step 340 will be explained hereinafter with reference to FIG. 4.

In Step 360 (i.e., sample reliability level calculation means), a value of the forget factor $\lambda$ is obtained following formulae 6 and 7.

$$\lambda = 1 - Gy \qquad \text{[Formula 6]}$$

$$y = (V - V_0) \cdot (T_0 - |T|) \cdot (\omega_0 - |\omega|) \cdot (dT_0 - |dT|) \qquad \text{[Formula 7]}$$

Wherein y indicates the reliability level of the relative angle $\theta_a$ adopted as the sampling value. As indicated in formulae 1–3, the larger the value of the reliability level y, the higher the precision of the sampling value $\theta_a$ and the neutral angle $\theta_c$.

When the value of the vehicle speed V is equal to or greater than 80 km/h, the value of the vehicle speed V is replaced by 80 km/h. A gain G is a constant for converging the value of $\lambda$ to an appropriate range (e.g., $0.95 \subseteq \lambda \subseteq 1$).

Steps 370 and 390 are carried out in the same manner with Steps 770 and 790 of FIG. 9. Because the calculation parameter (i.e., forget factor $\lambda$) is optimized in accordance with the reliability level y as the neutral angle $\theta_c$ relating to the sampling value $\theta_a$, by dynamically optimizing the forget factor $\lambda$ as foregoing, the foregoing problems of the convergence and the reliability are simultaneously and reasonably solved.

Figure 4:
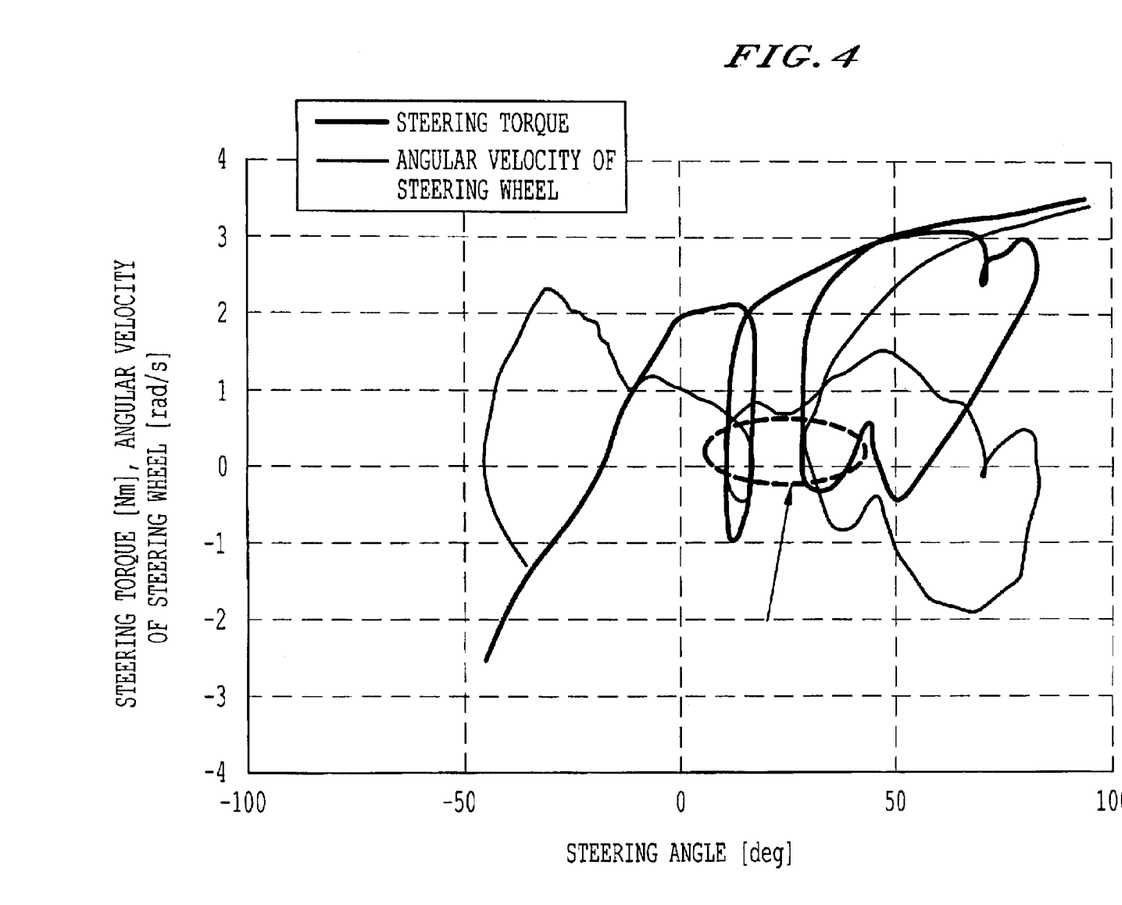
FIG. 4 is a graph showing behavior of a steering torque T and an angular velocity ω of the steering relative to a steering angle.

FIG. 4 shows a graph for illustrating the behavior of the steering torque T and the steering angle speed $\omega$ relative to the steering angle (i.e., accurate absolute angle $\theta$). The graph shows a state of the steering operation for continuously varying the steering torque being dynamically drastically varied under the vehicle speed around 50 [km/h]. When the steering operation as shown in FIG. 4 is performed, the absolute angle $\theta$ is not always positioned around the neutral point as viewed in a range indicated with an oval dotted line of FIG. 4.

In Step 340 of FIG. 3, the relative angle $\theta_a$ of the steering angle sampled under the foregoing unfavorable condition is removed from the sample set of the neutral angle $\theta_c$. Thus, by following Steps of the first embodiment of the present invention, the high precision of the neutral angle $\theta_c$ can be ensured even when the steering operation for drastically and dynamically varying the steering torque T is continued.

Figure 5:
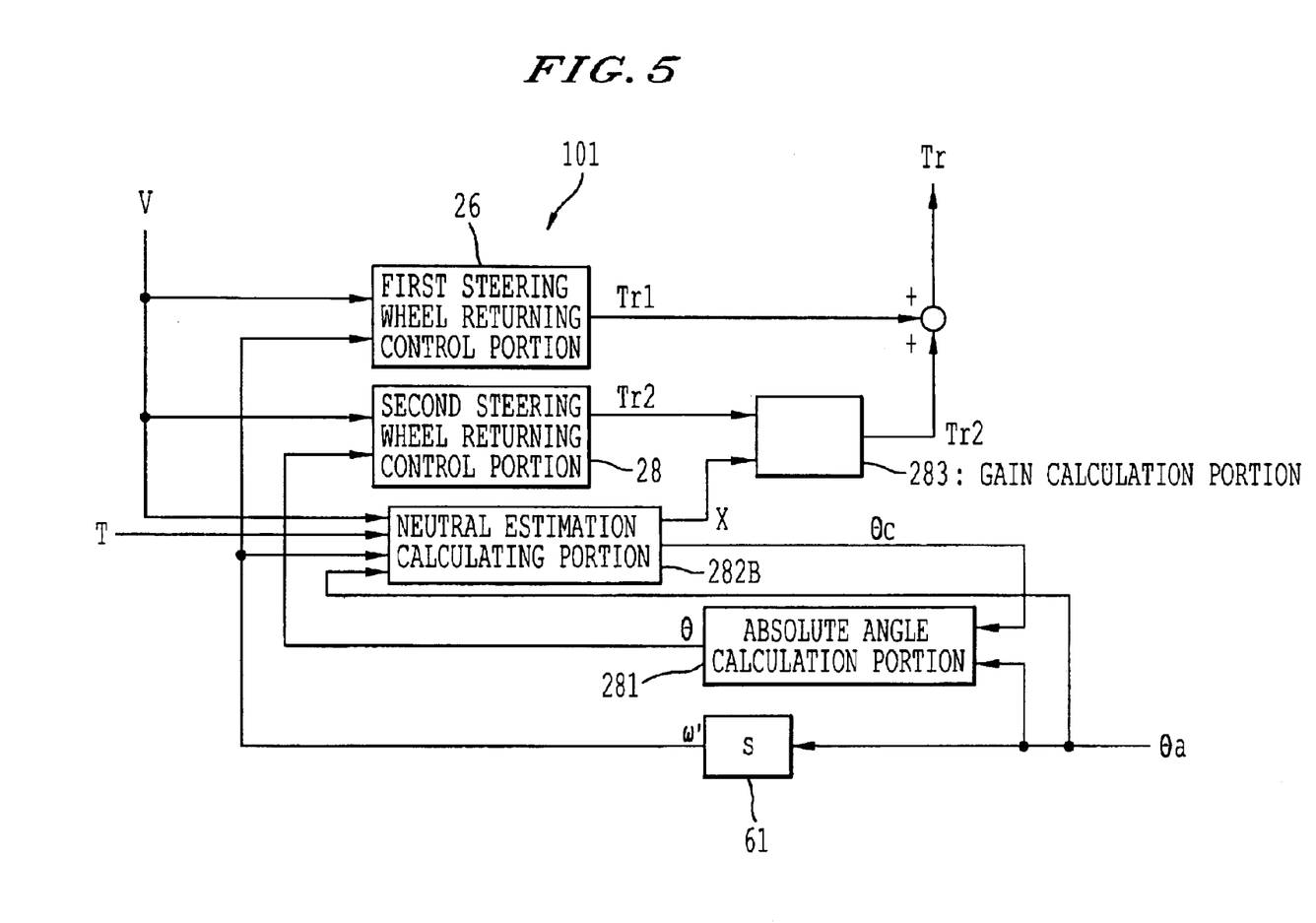
FIG. 5 is a block diagram of the electric power steering device according to a second embodiment of the present invention.

FIG. 5 shows an electric power steering device 101 according to a second embodiment of the present invention. The portion sharing the same construction with the electric power steering device 100 of the first embodiment is not shown in FIG. 5. The characteristics of the electric power steering device 101 is that a neutral angle reliability level calculation means for calculating a reliability level X of the neutral angle $\theta_c$ is provided in a neutral estimation calculation portion 282B (i.e., serving as neutral angle estimation means). Further, a gain (i.e., calculation factor) for calculating the torque $T_{r2}$ for returning the steering wheel is varied in accordance with the value of the reliability level X.

In other words, a correction relative to the torque $T_{r2}$ for returning the steering wheel is carried out as follows in a gain calculation portion 283 of FIG. 5. A formula 8 indicates transaction for re-storing the value of the variable $T_{r2}$ multiplied by the reliability level X (i.e., the gain) in a storing region. The first steering wheel returning control portion 26 for determining the torque $T_{r1}$ depending on $\omega$, the second steering wheel returning control portion 28 for determining the torque $T_{r2}$ depending on $\theta$, and the gain calculation portion 283 serve as a control means for returning the steering wheel.

$$T_{r2} = X \cdot T_{r2} (0 \subseteq X \subseteq 1) \qquad \text{[Formula 8]}$$

The reliability level X is defined based on the differential equation shown in formulae 9 and 10. When the value of the reliability level X exceeds one (1), the reliability level X is compulsorily determined to be one (i.e., X=1). When the reliability level X shows the negative value, the reliability level X is compulsorily determined to be zero (i.e., X=0). $X_{(n)}$ shows the value of the reliability level X to be calculated in the present control cycle. $X_{(n-1)}$ shows the value of the reliability level X calculated in said last control cycle.

$$X_{(n)} = X_{(n-1)} + dX \qquad \text{[Formula 9]}$$

$$dX = G2 \cdot (\Delta\Theta - |\theta_a - \theta_c|) \cdot y \qquad \text{[Formula 10]}$$

Figure 6:
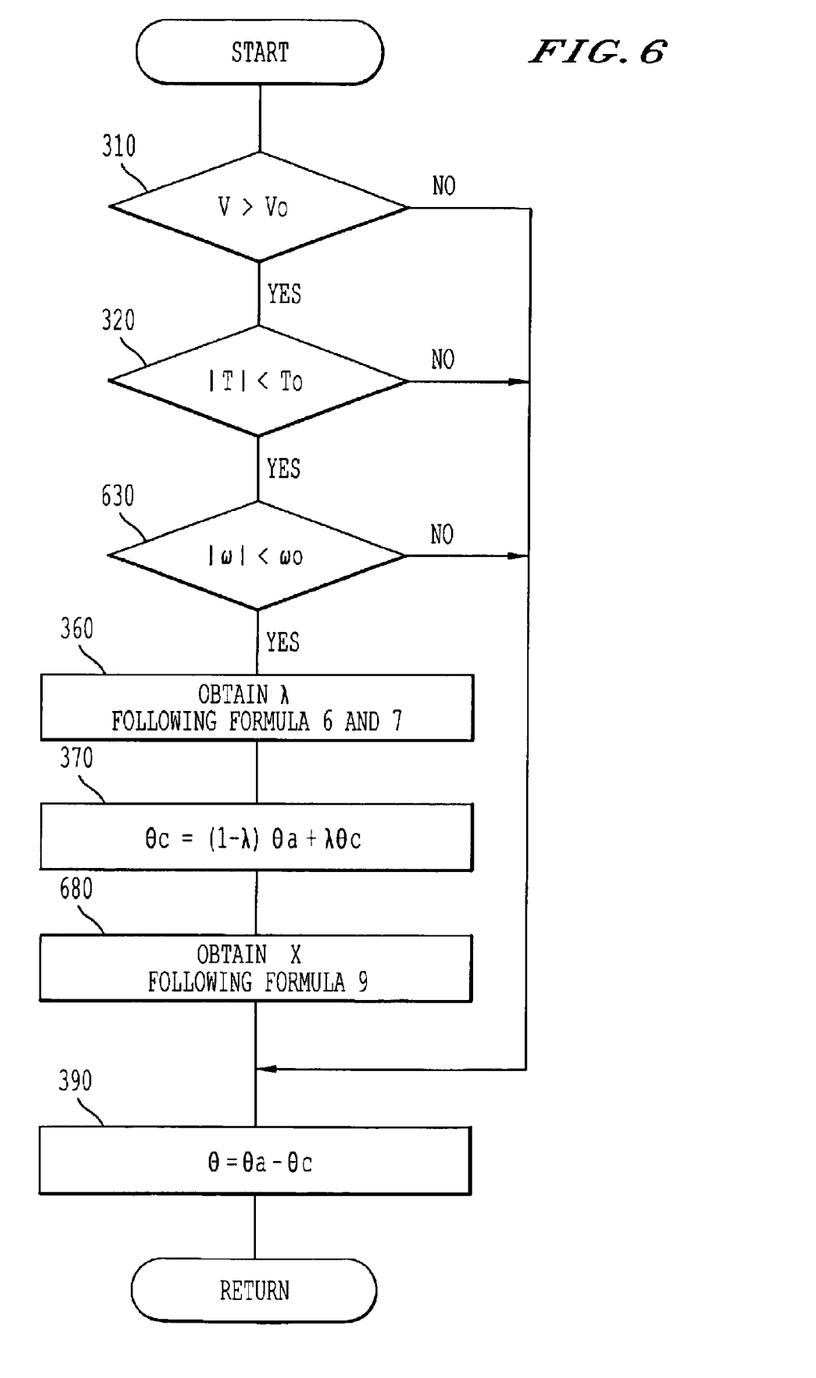
FIG. 6 is a flowchart showing the transaction of a neutral estimation calculation portion of the electric power steering device according to the second embodiment of the present invention

In formula 10, $\Delta\Theta$, for example, corresponds to a constant indicating the angle of 10 degrees and determines an appropriate value corresponding to the actually required precision and the measurement precision of the neutral point when the value of the absolute angle $\theta$ are applied to various application programs and control programs such as the second control for returning the steering wheel (i.e., 28 of FIG. 5). y corresponds to the reliability of formula 7. G2 corresponds to the gain empirically optimized so that the reliability level X truly shows the reliability level of the neutral angle $\theta_c$. The foregoing calculation of the reliability level X is carried out at a timing of Step 680 of FIG. 6. FIG. 6 shows a flowchart for illustrating the transaction of the neutral estimation calculation portion 282B of the electric power steering device 101 according to the second embodiment of the present invention.

For example, in case the absolute value of the difference between the estimated value of the neutral angle $\theta_c$ calculated by the neutral angle estimation means and the sampling value $\theta_a$ satisfying the predetermined sampling condition exceeds 10 degrees, the estimated value of the neutral angle $\theta_c$ may become inapplicable during the driving due to the disturbance generated relative to the steering system during the driving. Notwithstanding, with the foregoing construction of the neutral angle reliability level calculation means according to the second embodiment of the present invention, the reliability of the estimated value of the obtained neutral angle $\theta_c$ can be quantitatively evaluated with high precision. Thus, when the dX becomes, for example, less than zero (i.e., $dX \subset 0$) due to the disturbance, the output of the torque $T_{r2}$ for returning the steering wheel depending on the absolute angle $\theta$ is restrained by the effects of formulae 8 and 9.

For example, by providing the neutral angle reliability level calculation means (i.e., Step 680) for calculating the reliability level X of the neutral angle $\theta_c$ in the neutral estimation calculation portion 282B (i.e., neutral angle estimation means), the phenomenon (i.e., error) for returning the steering wheel to the wrong neutral point can be avoided by reducing the factor (i.e. gain) for the calculation and the value of the torque $T_r$ for returning the steering wheel when the reliability level X is low. On the other hand, when the reliability level X is high, a desired control for returning the steering wheel based on the absolute angle $\theta$ can be securely performed.

According to the second embodiment of the present invention, the angular velocity $\omega$ of Step 630 of FIG. 6 is obtained based on formula 11.

$$\omega = \omega' + \mu dT \quad \text{[Formula 11]}$$

Wherein dT shows the differentiation of the steering torque T (i.e., displacement amount per control cycle). $\mu$ corresponds to a constant being proportional to the reciprocal of a spring constant of a torsion bar (not shown) included in the torque sensor 15. $\omega'$ corresponds to an angular velocity output from the differentiation calculation portion 61 of FIG. 5. The angular velocity $\omega'$ is obtained by the same manner with the angular velocity $\omega$ of the first embodiment. The angular velocity $\omega$ on the left side of the equation of formula 11 is calculated as an addition of a rotational angular velocity ($\mu$dT) relative to the pinion shaft 13 of the torsion bar calculated by the variation amount of the steering torque T and a rotational angular velocity of the pinion shaft 13 (i.e., the angular velocity $\omega'$ output from the differential calculation portion of FIG. 5).

With the foregoing correction means, the steering angular velocity $\omega$ can be further more accurately calculated compared to the first embodiment of the present invention without ignoring the influence of the variation amount of the torsion bar included in the torque sensor 15. Step 340 of the first embodiment for increasing the degree of the high precision can be replaced by the foregoing method. The compensation in the foregoing manner is particularly effective when the value of the constant $\mu$ is large, in other words, when the spring constant of the torsion bar is relatively small.

Although the reliability level X is used as the calculation parameter (i.e., gain) for determining the torque $T_{r2}$ (i.e., portion depending on $\theta$) for returning the steering wheel, the reliability level X may be applied as the calculation parameter (i.e., gain) for determining the torque $T_{r1}$ for returning the steering wheel (i.e., portion depending on $\omega$).

Figure 7:
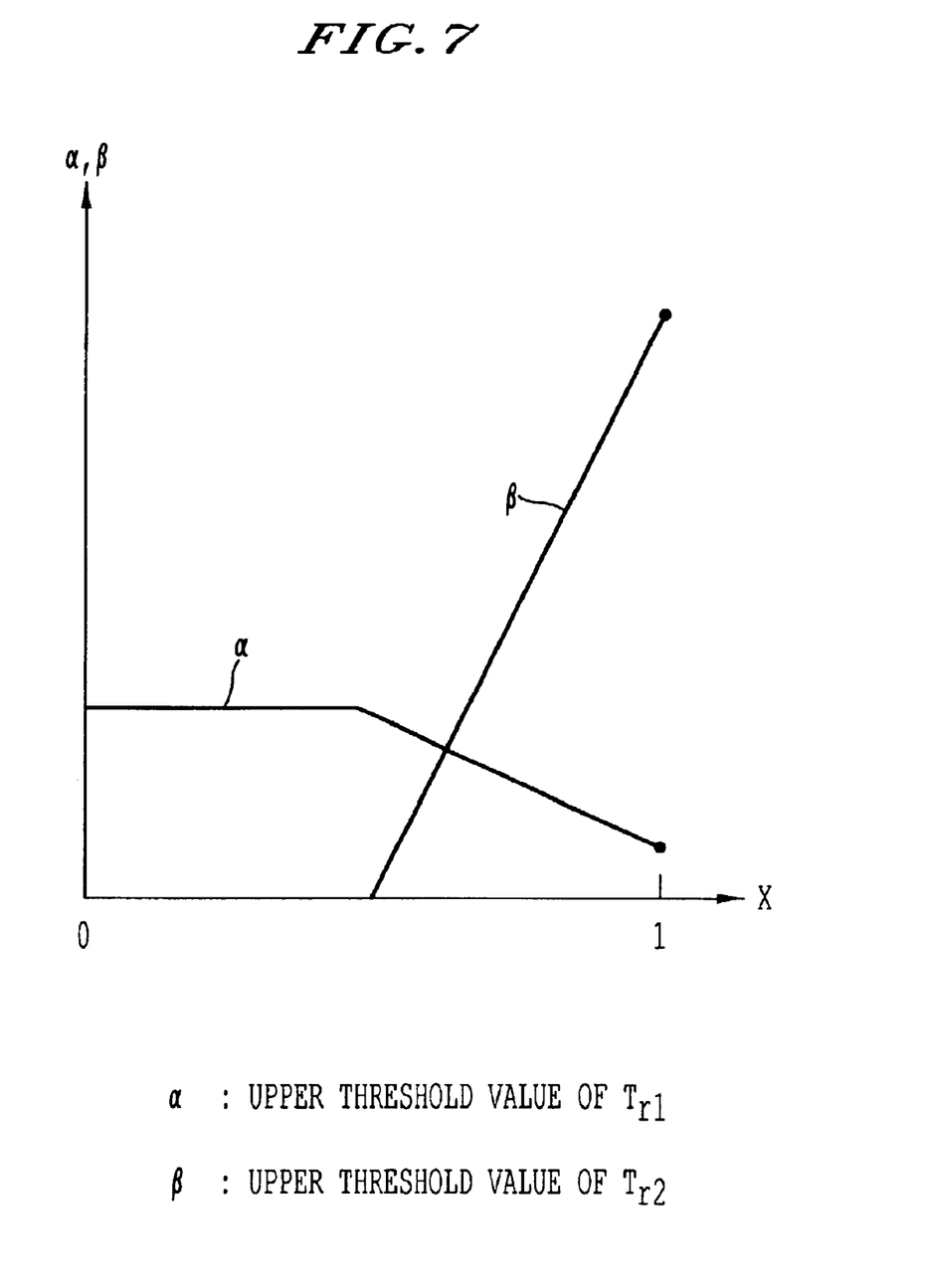
FIG. 7 is a graph showing a control method for varying α (i.e., upper threshold value of $T_{r1}$) and β (i.e., upper threshold value of $T_{r2}$).

FIG. 7 shows a graph for illustrating the control method for varying the upper threshold ($\alpha$) of $T_{r1}$ and the upper threshold ($\beta$) of $T_{r2}$ based on the reliability level X. For example, with the setting as shown in FIG. 7, when the reliability level X of the neutral angle $\theta_c$ is high, the desired torque for returning the steering wheel can be generated to be sufficiently large by sufficiently increasing the torque $T_{r2}$ for returning the steering wheel depending on the absolute angle $\theta$. On the other hand, when the reliability level X of the neutral angle $\theta_c$ is low, a bare minimum of the alternative torque $T_{r1}$ for returning the steering wheel can be generated.

Figure 8:
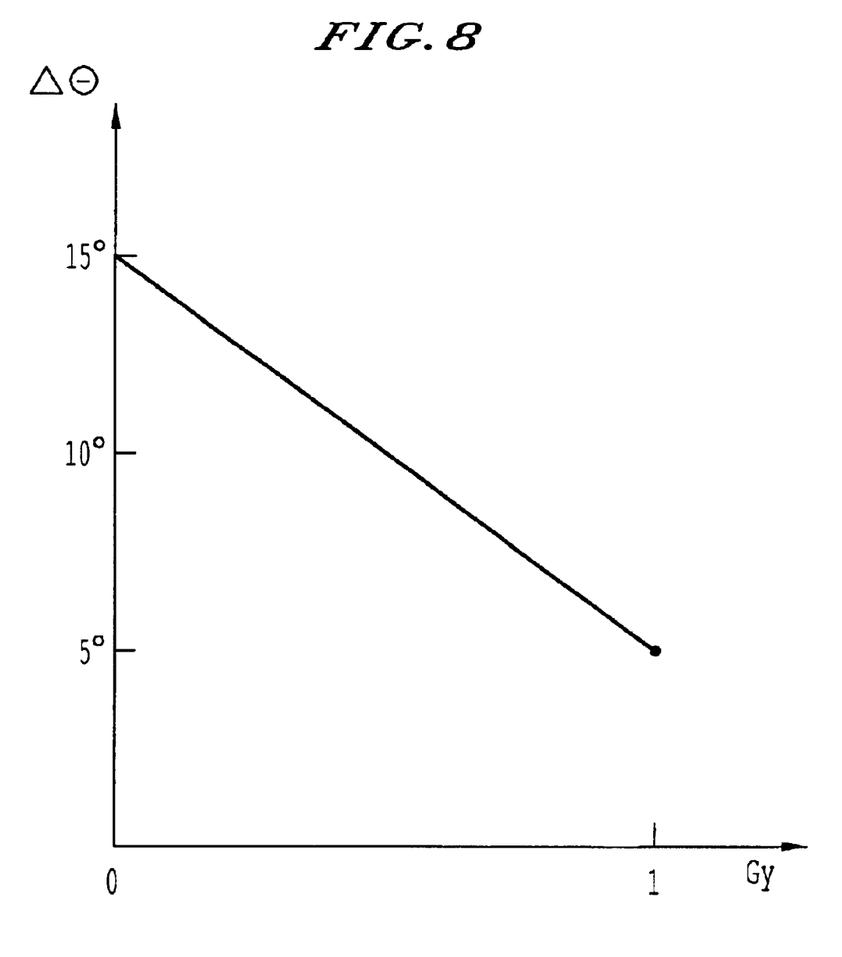
FIG. 8 is a graph showing a control method for varying ΔΘ and dX based on reliability level X.

Formula 10 may be transformed as formula 12 as follows.

$$dX = G2 \cdot (\Delta\Theta(y) - |\theta_a - \theta_c|) \cdot y \quad \text{[Formula 12]}$$

wherein, $\Delta\Theta(y)$ corresponds to a function of the reliability level y. $\Delta\Theta(y)$ may be, for example, defined as shown in FIG. 8.

FIG. 8 shows a graph illustrating the control method for varying $\Delta\Theta$ and dX based on the reliability level y. The coefficient (i.e., gain G) of the reliability level y of the lateral axis is identical to the constant applied in formula 6. For example, by using formulae 9 and 10 according to the second embodiment based on the foregoing setting, the further accurate reliability level X of the neutral angle $\theta$ can be obtained.

With the embodiments of the present invention, the calculation parameter $\lambda$ can be optimally determined in accordance with the reliability level y as the neutral angle $\theta_c$ relating to the sampling value $\theta_a$. Thus, the problems of the convergence and the reliability can be simultaneously and reasonably solved.

In case the absolute value of the difference between the neutral angle $\theta_c$ calculated by the neutral angle estimation means and the sampling value $\theta_a$ satisfying the predetermined sampling condition is, for example, equal to or greater than 15 degrees, the estimated value of the neutral angle $\theta_c$ may become inapplicable during the vehicle driving due to the disturbance generated relative to the steering system during the vehicle driving. Thus, the means (i.e., neutral angle reliability level calculation means) for quantatively evaluating the reliability of the estimated value of the neutral angle $\theta_c$ obtained by the neutral angle estimation means with high precision can be constructed by calculating the reliability level X of the neutral angle $\theta_c$ based on the absolute value of the difference between the neutral angle $\theta_c$ and the sampling value $\theta_a$.

Accordingly, the control means for returning the steering wheel for determining the torque $T_r$ for returning the steering wheel, the calculation method for determining the torque $T_r$, and the calculation parameter for determining the torque $T_r$ can be configured based on the reliability level X. For example, when the reliability level X is low, the error for retuning the steering wheel to the wrong neutral point can be avoided by reducing the coefficient (gain) for the calculation and the value of the torque $T_r$ for returning the steering wheel. When the reliability level X is high, the desired control for returning the steering wheel can be securely achieved based on the absolute angle $\theta$. The problems of the reliability can be solved with the foregoing means.

According to the embodiments of the present invention, the value of the reliability level y can be applied for calculating the reliability level X. Thus, the value of the reliability level X with higher precision can be obtained with the simple methods.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric power steering device comprising:
   a neutral angle estimation means for estimating a neutral angle $\theta c$ of a steering angle based on a sampling value $\theta a$ of the steering angle when a predetermined sampling condition is established, the sampling condition being defined by a vehicle speed V, an angular velocity $\omega$ of the steering angle, a steering torque T, or relating values of the vehicle speed V, the angular velocity $\omega$ of the steering angle, and the steering torque T; and a sample reliability level calculation means for calculating a reliability y of the sampling value θa as the neutral angle θc based on the vehicle speed V, the angular velocity ω, the steering torque T, or the relating values of the vehicle speed V, the angular velocity ω of the steering angle, and the steering torque T when the sampling condition is established;

wherein the neutral angle estimation means temporarily determines, confirms, or renews the value of the neutral angle θc based on the sampling value θa and the reliability level y.

2. An electric power steering device comprising:

a neutral angle estimation means for estimating a neutral angle θc of a steering angle based on a sampling value θa of the steering angle when a predetermined sampling condition is established, the sampling condition being defined by a vehicle speed V, an angular velocity ω of the steering angle, a steering torque T, or the relating values of the vehicle speed V, the angular velocity ω of the steering angle, and the steering torque T;

a neutral angle reliability level calculation means for calculating a reliability level X of the neutral angle θc based on an absolute value of a difference between the neutral angle θc calculated by the neutral angle estimation means and the sampling value θa; and a control means for returning a steering wheel for determining a torque Tr for returning the steering wheel, for determining a calculation parameter for obtaining the torque Tr for returning the steering wheel, and for determining a calculation method for obtaining the torque Tr for returning the steering wheel.

3. An electric power steering device according to claim 1 further comprising:

a neutral angle reliability level calculation means for calculating a reliability level X of the neutral angle θc based on an absolute value of a difference between the neutral angle θc calculated by the neutral angle estimation means and the sampling value θa; and a control means for returning a steering wheel for determining a torque Tr for returning the steering wheel, for determining a calculation parameter for obtaining the torque Tr for returning the steering wheel, and for determining a calculation method for obtaining the torque Tr for returning the steering wheel.

4. An electric power steering device according to claim 1, wherein the reliability level y is calculated based on the vehicle speed and a boundary value of the vehicle speed, a boundary value of a torque and an absolute value of the torque, a boundary value of the angular velocity and an absolute value of the angular velocity, an absolute value of a difference between a present steering torque and last steering torque and a predetermined threshold value of the difference between the present steering torque and said last steering torque.

5. An electric power steering device according to claim 4, wherein the sample reliability level calculation means adopts the sampling value θa as the sampling value of the neutral angle θc when the absolute value of the difference between the present steering torque and said last steering torque is smaller than the predetermined threshold value of the difference between the present steering torque and said last steering torque.

6. An electric power steering device according to claim 2, wherein the absolute value of the difference between the neutral angle θc and the sampling value θa and a predetermined value determine a correction amount dX.

7. An electric power steering device according to claim 6, wherein a present value of the reliability level X is renewed or calculated by correcting last value of the reliability level X with the correction amount.

8. An electric power steering device according to claim 3, the absolute value of the difference between the sampling value θa and the neutral angle θc and a predetermined value determines a correction amount dX.

9. An electric power steering device according to claim 8, wherein a present value of the reliability level X is renewed or calculated by correcting last value of the reliability level X with the correction amount.

10. An electric power steering device according to claim 6, wherein the predetermined value corresponds to a constant indicating a predetermined angle.

11. An electric power steering device according to claim 8, wherein the predetermined value corresponds to a function of the reliability level y.

12. An electric power steering device according to claim 2, wherein the control means for returning the steering wheel includes a control portion for returning the steering wheel, and a gain calculation portion for receiving the reliability level X and a torque for returning the steering wheel from the control means for returning the steering wheel.

13. An electric power steering device according to claim 12, wherein the gain calculation portion receives the torque for returning the steering wheel depending on the absolute angle θ.

14. An electric power steering device according to claim 2, further comprising: a torsion bar; wherein the angular velocity is obtained based on a constant being proportional to a reciprocal of a spring constant of the torsion bar and a differential value of the steering torque.

15. An electric power steering device according to claim 3, further comprising: a torsion bar; wherein the angular velocity is obtained based on a constant being proportional to a reciprocal of a spring constant of the torsion bar and a differential value of the steering torque.

16. An electric power steering device comprising:

a neutral angle estimation means for estimating a neutral angle θc of a steering angle based on a sampling value θa of the steering angle when a predetermined sampling condition is established, the sampling condition being defined by a vehicle speed V, an angular velocity ωof the steering angle, a steering torque T, or relating values of the vehicle speed V, the angular velocity ω of the steering angle, and the steering torque T; and a sample reliability level calculation means for calculating a reliability y of the sampling value θa as the neutral angle θc based on the vehicle speed V, the angular velocity ω, the steering torque T, or the relating values of the vehicle speed V, the angular velocity ω of the steering angle, and the steering torque T when the sampling condition is established, wherein the reliability level y is calculated based on at least one of the vehicle speed and a boundary value of the vehicle speed, a boundary value of a torque and an absolute value of the torque, a boundary value of the angular velocity and an absolute value of the angular velocity, an absolute value of a difference between a present steering torque and last steering torque and a predetermined threshold value of the difference between the present steering torque and said last steering torque;

wherein the neutral angle estimation means temporarily determines, confirms, or renews the value of the neutral angle θc based on the sampling value θa and the reliability level y.

* * * * *